United States Patent
Warren

(10) Patent No.: US 6,444,354 B1
(45) Date of Patent: *Sep. 3, 2002

(54) LOW IMPEDANCE FOLDED POLYMERIC LAMINATE RECHARGEABLE BATTERY AND METHOD OF MAKING

(75) Inventor: Paul C. Warren, Far Hills, NJ (US)

(73) Assignee: Valence Technology, Inc., Henderson, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,435
(22) Filed: May 20, 1999
(51) Int. Cl.[7] .............. H01M 10/00; H01M 6/00; H01M 8/00; H01M 6/42; H01M 6/12
(52) U.S. Cl. .............. 429/127; 429/158; 429/162
(58) Field of Search .............. 429/152, 162, 429/149, 127, 158

(56) References Cited

U.S. PATENT DOCUMENTS

| | | | | |
|---|---|---|---|---|
| 5,300,373 A | * | 4/1994 | Shackle | 429/152 |
| 5,460,904 A | * | 10/1995 | Gozdz et al. | 429/192 |
| 5,582,931 A | * | 12/1996 | Kawakami | 429/127 |

* cited by examiner

Primary Examiner—Stephen Kalafut
Assistant Examiner—Julian A. Mercado
(74) Attorney, Agent, or Firm—Harness, Dickey & Pierce, P.L.C.

(57) ABSTRACT

Single cell laminated polymeric rechargeable battery sheets are folded in irregularly alternating directions about parallel fold axes to provide battery cell structures presenting available terminal locations requiring reduced collector element current travel distance to thereby significantly reduce battery impedance. An embodiment enables the use of equilateral cell sheets which are folded about orthogonal axes in two dimensions to yield battery cells with exceptionally high ratios of active area to collector-origin impedance.

20 Claims, 3 Drawing Sheets

LOW IMPEDANCE FOLDED POLYMERIC LAMINATE RECHARGEABLE BATTERY AND METHOD OF MAKING

BACKGROUND OF THE INVENTION

This invention relates to a rechargeable electrolytic battery fabricated from a unitary flexible laminate cell sheet of polymeric electrode and separator elements, and electrically-conductive foil current collector elements. In particular, the invention relates to a method of shaping and sizing such a battery by folding the laminate cell sheet in a manner which enables the battery terminals to be located on the collector elements at positions which minimizes the distance of current flow through the collectors and thus reduces the impedance encountered within the battery.

Versatile rechargeable battery cells, such as lithium-ion intercalation cells, are currently prepared from electrode elements comprising flexible sheets of polymeric composition in which are dispersed finely-divided particulate materials capable of reversibly intercalating lithium ions during battery charge/discharge cycles. Such materials may include, as positive electrode components, lithium metal oxide intercalation compounds, e.g., $LiCoO_2$, $LiNiO_2$, and $LiMn_2O_4$, and, as negative electrode components, carbon materials, such as petroleum cokes and graphites.

Included in the cell structures are flexible electrode-interposed separator layer elements comprising polymers of essentially the same type as employed in the electrode elements, thus facilitating thermal lamination of the element layers to ultimately form the battery composite. Metallic foil electrical current collector elements are also incorporated into the battery cell structure in a laminating operation which essentially embeds these current collectors into the surface of the respective electrode layer elements.

A laminated battery cell representative of present structures is depicted in FIG. 1 of this specification, and the general process of battery cell fabrication is described in greater detail in U.S. Pat. No. 5,460,904 and its related patent specifications, incorporated herein by reference, which discuss typical compositions and procedures for formulating and laminating composite lithium-ion cells.

The simple single cell battery, a representative section of which is shown in FIG. 1, is typically about 0.4 mm thick and may be fabricated as individual sheets of any desired area or, if a continuous process is employed, as a single sheet several meters long which, due to the flexibility of the laminate, may be stored in roll form prior to later processing and conversion to final battery size.

As has been noted in the above-mentioned references, among others, the general performance of the polymeric laminated battery depends upon the composition and structure of the electrode elements. That is to say, the operating voltage range of a battery cell is determined by the electromotive potential difference between the active materials comprising the respective electrodes, while the electrical energy storage capacity depends upon the amount of such materials contained in the cell. The ultimate battery voltage may thus be varied by electrically connecting a number of cells in series and its capacity may be increased by arranging a number of single cells in parallel, increasing the thickness or number of electrode layers in a cell, or increasing the area, i.e., the dimensional size, of a single cell. Of the alternatives affecting battery capacity, the latter is the most feasible, since less extraneous materials, such as connecting conductors, and fewer processing steps are required, and the flexibility and higher functional speed of a thinner laminate are maintained, as well.

Practical disadvantages arise in the latter practice, however, not the least among which is the fact that a single cell of useful capacity would be of unwieldy dimension if allowed to remain as a planar sheet. For this reason it has been normal practice to utilize a cell in the form of an elongate strip-like sheet of practical width and either roll the sheet tightly about its lesser transverse axis or fold the sheet repeatedly at parallel such axes in zig-zag or accordion fashion to obtain a multi-layer cell of desired rectangular dimensions.

Unfortunately, other disadvantages arise in these procedures. Notably, in the rolling scheme, there is required an extraneous insulating sheet to prevent short-circuiting between the otherwise contacting opposite-polarity faces of the cell laminate. On the other hand, while not hampered by this problem due to the fact that the faces of each folded segment of a laminate cell contact a like-polarity face, the folded cell shares with the rolled cell the additional disadvantage that in order to be readily accessed for attachment of conductor wire or the like, a terminal must be located on the face of a current collector layer of the cell laminate at a point near the outermost end of the cell strip. As a result of such a location, electrical current being drawn from the terminal must traverse the longest available path through the entire length of the current collector layer and will therefore be most affected by the impedance inherent in the collector material. The degrading effect of this situation is most prominent in the presence of high current densities or in collector materials of lesser conductivity, such as the aluminum typically associated with the positive battery cell electrodes, or where the thickness of the collector layer element is greatly reduced in the interest of weight limitation.

The purpose of the present invention is therefore to alleviate these problems associated with the previous restriction on terminal location in folded laminate battery cells by means of a unique folding method which provides outside face access to current collector layer segments situated at the more centrally located regions of a battery cell strip. In addition, the problems are addressed at their source in the aspect of the method of cell laminate folding which greatly reduces the inordinate length of the initial single cell in favor of a cell with more equilateral dimensions.

SUMMARY OF THE INVENTION

In with accordance one embodiment of the present invention, an elongate strip-shaped laminate battery cell, preferably the simple single cell which presents the thinnest and most flexible cross-section, is folded in such a manner about parallel, spaced transverse axes defining substantially equal longitudinal segments of the cell that contacting electrode collector surfaces are always of the same polarity.

Such a general folding pattern would appear, at the outset, to be similar to the zig-zag folds of the prior art which is depicted in FIG. 2. However, whereas the prior folding scheme comprised an uninterrupted fold series of repeated alternating direction, i.e., forward or reverse fold, the present method intersperses within the fold sequence a number of repeated same-direction folds. For example, in the prior procedure of FIG. 2, the forward-reverse folding sequence, which may be more graphically considered in terms of clockwise (CW) and counter-clockwise (CCW), an odd number of segments e.g., five, so-selected to preserve the outward-lying disposition of one each of the positive and negative electrode collectors, are formed from the fold sequence of CW-CCW-CW-CCW. An embodiment of the invention, on the other hand, as shown in FIG. 3, is formed of the fold sequence of CW-CCW-CCW-CW.

As a result of the irregular fold sequence of the invention, at least one of the collector surfaces, preferably that of the collector material of higher electrical resistance, located at or closely adjacent to the centrally-disposed segment of the cell strip is exposed at the outer surface of the folded structure and may bear an accessible battery terminal. Such a terminal location serves to minimize the collected current travel distance and the resultant impedance within the collector layer.

In a further embodiment of the invention, the initial single cell laminate sheet is cut to a substantially equilateral shape which at once minimizes the collected current travel distance to any terminal location on a cell of given surface area. From this initial shape the cell is folded in alternating directions along parallel axes to obtain the odd number of segments, preferably three, which ensures outwardly-disposed collector surfaces of opposite polarity. According to the invention, the cell thus-folded is again folded in like manner into three segments along parallel axes lying orthogonal to the original fold axes. In this manner the initial cell is reduced to a battery of one-ninth the exposed area having a collector surface of each polarity to which the respective terminals may be affixed while providing the minimum impedance resulting from collected current travel distance.

BRIEF DESCRIPTION OF THE DRAWING

The present invention will be described with reference to the accompanying drawing of which.

DESCRIPTION OF THE INVENTION

Figure 1:
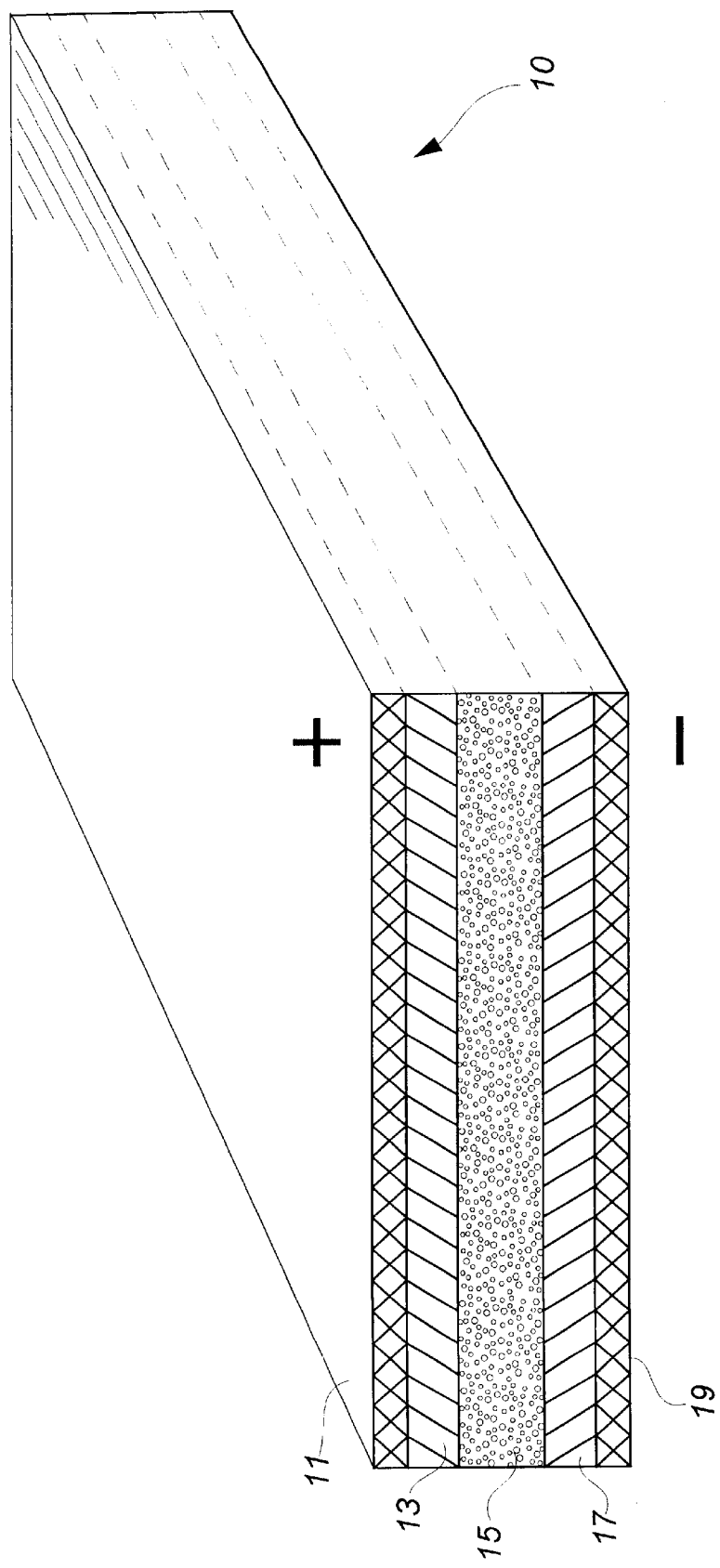
FIG. 1 is a cross-sectional perspective view of a typical laminated lithium-ion battery cell structure useful in the application of the present invention.

Useful laminated lithium-ion cell batteries have been made available economically through the technological advances described in the above-referenced incorporated patent specifications. A representative structure of such a cell 10 is depicted in FIG. 1 and essentially comprises positive and negative electrode layer elements 13, 17 between which is interposed an electron-insulative, ion-transmissive separator element 15 comprising, e.g., a microporous polymeric matrix, preferably of a polyvinylidene fluoride copolymer, within which a lithium salt electrolyte solution is readily absorbed. These electrode elements respectively comprise a lithiated intercalation compound, e.g., $Li_xMn_2O_4$, and a complementary material capable of reversibly intercalating lithium ions, e.g., carbon in the form of petroleum coke or graphite, each dispersed as finely-divided particulates in a polymeric matrix of, for example, the noted copolymer. Electrically-conductive current collectors 11, 19, preferably of aluminum and copper, respectively, are bonded by thermal lamination with respective electrode elements 13, 17 to form electrode members which are, in turn, similarly bonded with separator element 15 to form a unitary battery cell. In order to facilitate subsequent processing of the cell, such as during the incorporation of lithium salt solution electrolyte, the collector elements 11, 19 are preferably permeable to fluids, such as in the form of a reticulate expanded metal grid.

Typical polymeric laminated battery cell compositions and element layers useful in the present invention are similar to those described in the referenced specifications and may be prepared as in the following examples.

EXAMPLE 1

A separator element coating solution is prepared by suspending 30 parts by weight of an 88:12 vinylidene fluoride (VdF):hexafluoropropylene (HFP) copolymer of about $380 \times 10^3$ MW (Kynar FLEX 2801, Atochem) and 20 parts silanized fumed silica in about 200 parts acetone and adding to this mixture about 40 parts dibutyl phthalate (DBP) plasticizer. The completed mixture is warmed to about 40° C. to facilitate dissolution of the copolymer and is homogenized in a laboratory ball mill for about 6 hr. A portion of the resulting slurry is coated on a glass plate with a doctor blade device gapped at about 0.5 mm. The acetone coating vehicle is allowed to evaporate within the coating enclosure under moderately flowing dry air at room temperature for about 10 min to yield a tough, flexible, plasticized film which is readily stripped from the glass plate. The film of about 0.1 mm thickness is easily cut into separator elements of any desired size and shape.

EXAMPLE 2

A positive electrode composition is prepared by homogenizing in a lid-covered stainless steel blender for about 10 min at 2500 rpm a mixture of 65 parts by weight of 53 μm sieved $Li_xMn_2O_4$, wherein $1 < x \leq 2$ (e.g., $Li_{1.05}Mn_2O_4$ prepared in a manner described in U.S. Pat. No. 5,266,299), 10 parts VdF:HFP copolymer (FLEX 2801) of Example 1, 18.5 parts dibutyl phthalate, 6.5 parts conductive carbon (Super-P Black, MMM Carbon, Belgium), and about 100 parts acetone. The resulting slurry is degassed by briefly applying a reduced pressure to the mixing vessel, and a portion is then coated on a glass plate with a doctor blade device gapped at about 0.4 mm. The coated layer is allowed to dry within the coating enclosure under moderately flowing dry air at room temperature for about 10 min to yield a tough, flexible film which is readily stripped from the glass plate. The film, comprising about 65% by weight of particulate active intercalation material, is about 0.12 mm thick and is easily cut into electrode elements of any desired size and shape.

EXAMPLE 3

A negative electrode composition is prepared by homogenizing in a lid-covered stainless steel blender for about 10 min at 2500 rpm a mixture of 65 parts by weight commercial petroleum coke (MCMB 25-10, Osaka Gas), 10 parts VdF:HFP copolymer (FLEX 2801) of example 1, 21.75 parts dibutyl phthalate, 3.25 parts Super-P conductive carbon, and about 100 parts acetone. The resulting slurry is degassed, and a portion is then coated on a glass plate with a doctor blade device gapped at about 0.5 mm. The coated layer is allowed to dry within the coating enclosure under moderately flowing dry air at room temperature for about 10 min to yield a tough, flexible film which is readily stripped from the glass plate. The film, comprising about 65% by weight of particulate active intercalation material, is about 0.15 mm thick and is easily cut into electrode elements of any desired size and shape.

EXAMPLE 4

An single cell battery, such as depicted at 10 in FIG. 1, comprising the foregoing elements may be prepared in the following manner. A positive current collector of aluminum foil 11 in the form of an open mesh grid of about 30–50 $\mu$m thickness (e.g., MicroGrid precision expanded foil, Delker Corp.) is trimmed to a desired size. To enhance the ensuing adherence to its associated electrode element layer and improve contact resistance, grid 11 is surface-cleaned of oxides, such as with a caustic wash, and dip-coated with a conductive primer composition of commercial battery grade conductive carbon black, such as MMM Super P, dispersed in a commercially-available aqueous suspension of a copolymer of polyethylene with acrylic acid, e.g., Morton International Adcote primer 50C12. The fluid composition is sufficiently thin to preserve the reticulate nature of the grid and air-dries on the grid strands to a coating of about 1–5 $\mu$m thick.

A similarly-sized section is cut from the film of Example 2 to form a positive electrode element 13 which is then assembled in register with grid 11 and the assemblage is laminated in a commercial thermal, pressure roller card laminating apparatus at about 120–150° C. to form composite positive electrode member 11, 13. Negative electrode element 17 and collector element 19 are respectively cut to similar size from the film of Example 3 and a sheet of MicroGrid expanded copper foil and are similarly laminated to form composite negative electrode member 17, 19. A similarly-sized section of the film of Example 1 is cut to form separator element 15 which is centrally registered between the previously prepared composite electrode members and the assemblage is laminated at about 100–120° C. to form a sheet of unitary battery cell structure 10. Although not shown in FIG. 1, in order to ensure sufficient electrical insulation between the electrode elements, separator 15 may be sized to extend slightly at its edges beyond the periphery of the electrode elements 13, 17, or, preferably, cell 10 may be peripherally trimmed to form a bevelled edge of about 30° to 60°.

In typical battery fabrication practice, a cell of desired final size has affixed to the respective current collectors by means of solder, sonic welding, conductive adhesive or the like terminals to which may be attached wires or similar conductors for connection to an ultimate utilization device. The battery cell is thereafter extracted of plasticizer, imbibed with electrolyte solution, and hermetically packaged in the manner described in the noted references.

In order to provide samples for the preparation of comparative folded layer batteries in the development of the present invention, a laminated unitary master cell sheet 10, such as depicted in FIG. 1, was formed in the efficient, continuous web procedure described, for instance, in referenced U.S. Pat. No. 5,460,904. Initial battery cell sheets were cut from the master sheet and in order to obtain a desired final battery size and shape, or "footprint", each such sheet was folded according to the present invention, and for comparison, according to the prior art, as shown in the FIGS. and the following examples. The resulting battery cell structures were then completed by attachment of conductor wires (not shown) at the accessible outside terminal locations, processing to incorporate electrolyte solution, and hermetic packaging in the usual manner to provide rechargeable batteries.

EXAMPLE 5

Figure 2:
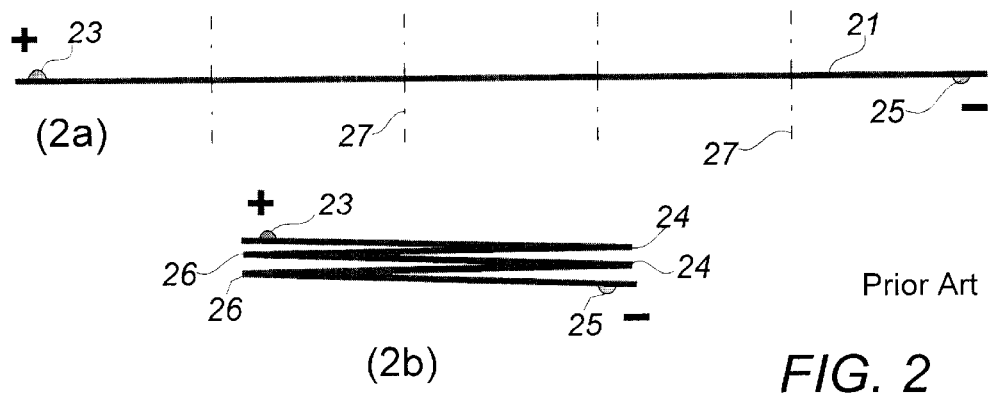
FIG. 2 is a series of progressive cross-sectional elevation views of a laminated battery cell in the form of an initial sheet and as folded according to prior practices.

An elongate single battery cell of about 200 mm×40 mm was taken from the master sheet by means of orthogonal transverse slicing cuts with a blade set at an angle from the perpendicular of the major plane surface of the master sheet to provide a bevel-edged initial cell sheet 21, shown simply as a single layer elevation in view (2a) of FIG. 2. The sheet was measured off along its longitudinal axis to define, as at phantom division lines 27, equal segments of about 40 mm each, and the sheet was folded in the manner of the prior art in zig-zag accordion fashion, as in view (2b), about transverse axes located at divisions 27 and compressed to obtain a final battery of about 40 mm×40 mm. This folding procedure follows the prior art sequence in which the direction of the folds alternate regularly between clockwise (CW) at 24 and counter-clockwise (CCW) at 26. The effect of this procedure, however, limits the accessibility of respective positive and negative terminals 23, 25 to locations near the ends of cell sheet 21 and results in a maximum distance for current travel along the collectors which approximates the full length of the sheet with substantial resulting degradation in effective capacity due to the accumulated impedance. The respective positions of the available terminal locationsb 23, 25 may be seen in view (2a) relative to the initial extended length of cell sheet 21.

EXAMPLE 6

Figure 3:
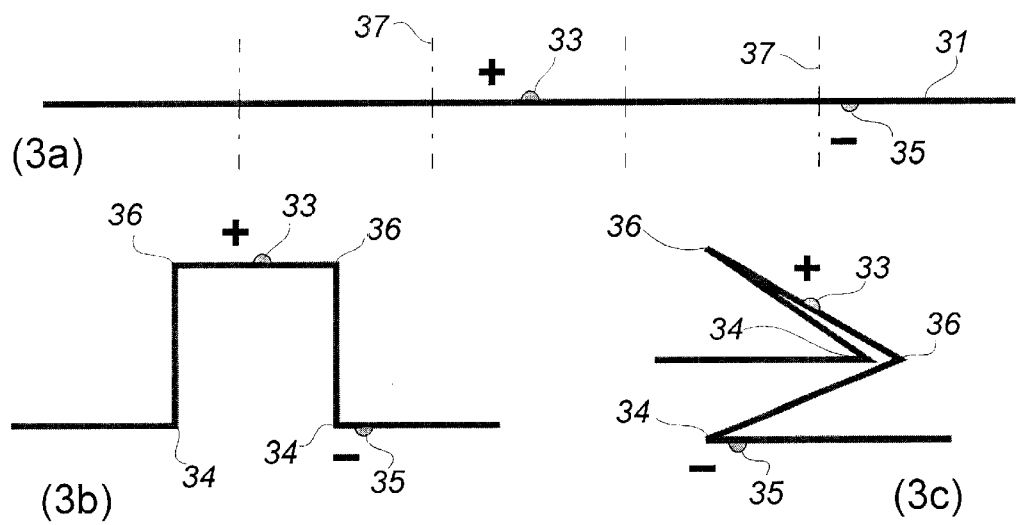
FIG. 3 is a series of progressive cross-sectional elevation views of a laminated battery cell in the form of an initial sheet and as sequentially folded according to an embodiment of the present invention.
Figure 3:
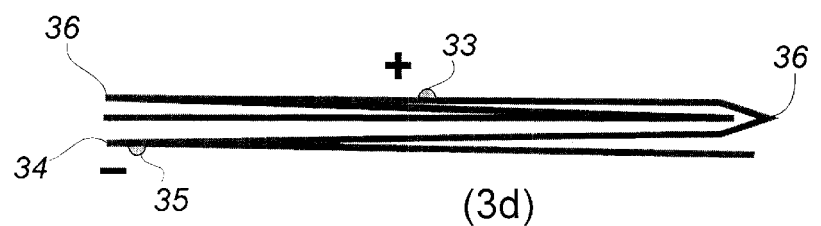

The essence of the present invention, on the other hand, may be seen in FIG. 3 where a comparably-sized cell sheet 31 of view (3a) is folded into the five segments at division lines 37 in an irregular alternation of CCW folds 34 and CW folds 36. The folds may be initially made as seen in view (3b) and then proceed further as in view (3c) where the effect of the irregular alternation may be seen to enable the insertion of a CCW fold 34 into a CW fold 36 while maintaining the required like-polarity face contact throughout the structure. Further compression of the folds as seen in view (3d) provides a compact 40 mm×40 mm cell of about 8×10$^3$ mm$^2$ active surface area similar to the cell of the prior art, but this cell of the invention yields a positive polarity terminal location at 33 which requires only about half the current travel distance in that collector as compared with the earlier structure. The fact that the positive collector element is commonly of the higher resistance material of the two, e.g., Al v. Cu, the lower resulting impedance in the cell is significant. As in the previous example, the relative locations of available terminal positions on the initial extended cell sheet are shown at 33, 35 in view (3a).

EXAMPLE 7

Figure 4:
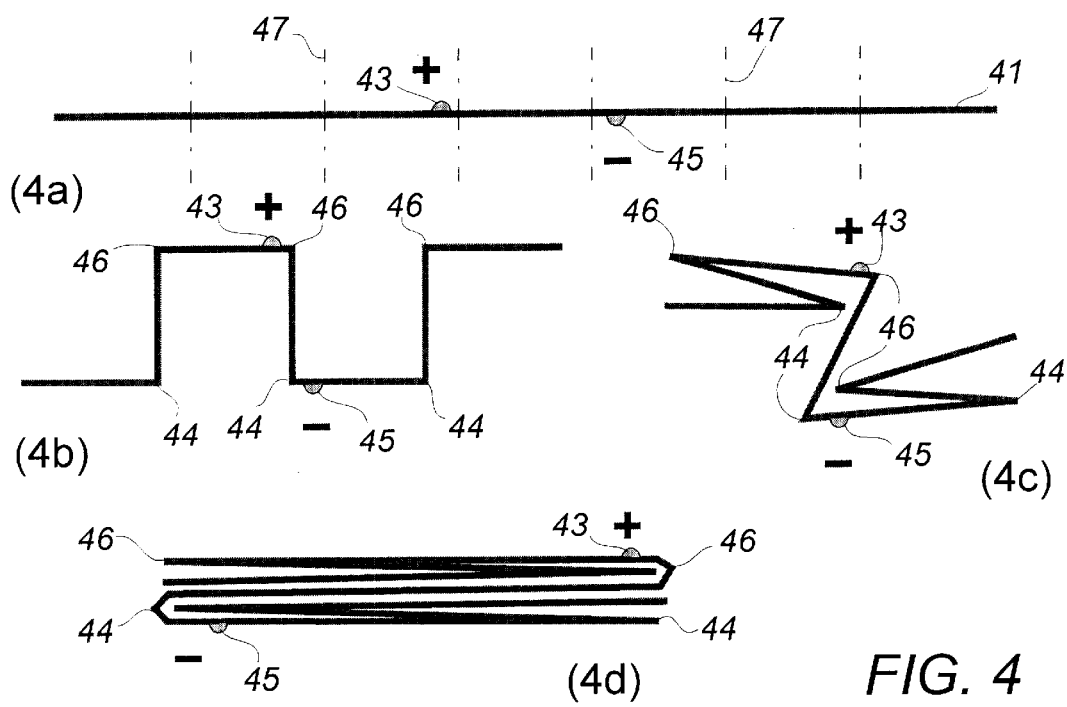
FIG. 4 is a series of progressive cross-sectional elevation views of a laminated battery cell in the form of an initial sheet and as sequentially folded according to another embodiment of the present invention.

A further embodiment of the present invention may be seen in FIG. 4 which depicts the folding procedure employed to provide substantially equal reduced current travel distance terminal locations at both cell collector surfaces. An initial sheet 41 of view (4a) is cut to about 280 mm×40 mm and measured to segments of 40 mm at division lines 47. Folding of the sheet at divisions 47 begins in the manner of view (4b) with irregular alternation of CCW 44 and CW 46 folds and proceeds as depicted in view (4c) with the insertion of one each of folds 44, 46 into respective opposite folds 46, 44 to thereby maintain the same-polarity electrode face contact while reducing the maximum current travel distance to available terminal locations 43, 45, as shown at compressed cell structure in view (4d), along both collector surfaces by about 45%. Such relative terminal positions along the full length of the 11.2×10³ mm² single cell sheet 41 may be seen in view (4a).

EXAMPLE 8

Figure 5:
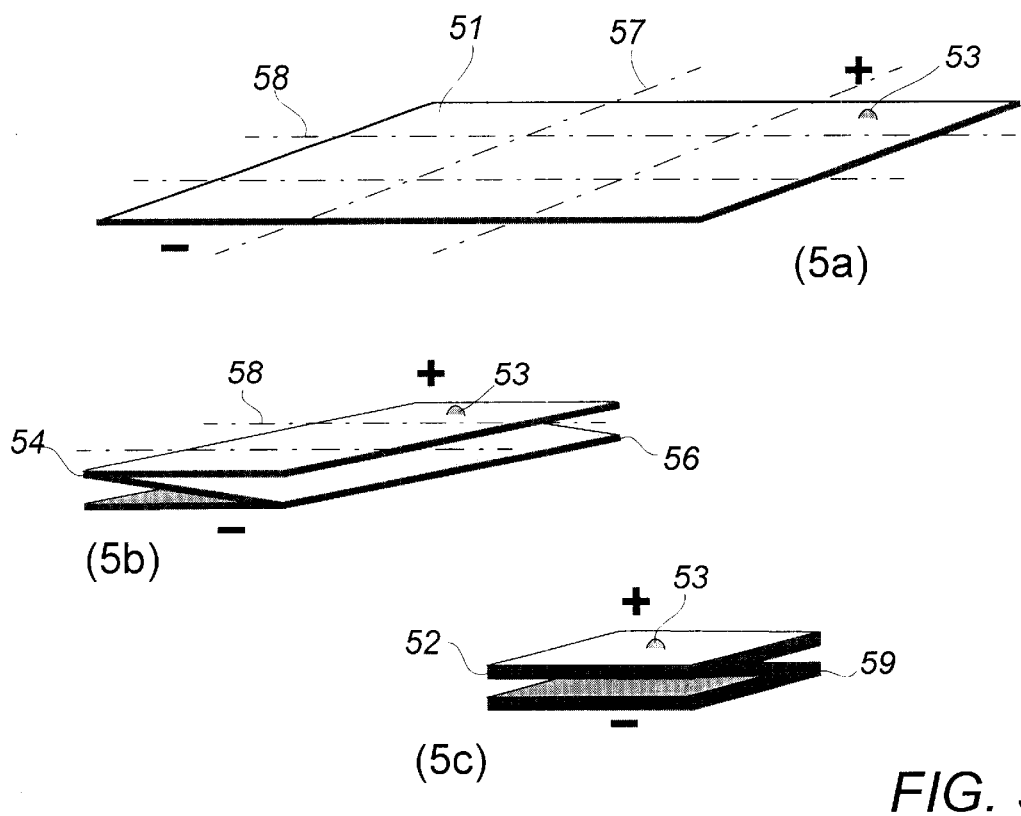
FIG. 5 is a series of progressive perspective views of a laminated battery cell in the form of an initial sheet and as sequentially folded in two dimensions according to yet another embodiment of the present invention.

A still further embodiment of the invention may be seen in FIG. 5 which depicts the otherwise regular alternation of sheet folds being effected along irregular orthogonal sets of fold axes. Such a procedure expands the advantages of the invention to enable the use of the greatest area of active electrode surface while requiring the least current travel distance to terminal locations, a reduction in this impedance factor of about 40%. Key to this improvement is the ability to utilize an equilateral initial cell sheet 51 of about 120 mm×120 mm which, as seen in view (5a) with orthogonal division axes 57, 58, provides about 14.4×10³ mm² active surface area in each electrode while enabling the location of terminals, as at 53, on each collector at a maximum current travel distance of only about 140 mm, less than about 70% of that required in the best of the foregoing examples relative to effective electrode area. The procedure of folding begins in view (5b) with a first stage at parallel CCW and CW folds 54, 56 along axes 57. To aid in the ease of the subsequent folding steps, folds 54, 56 may preferably be slit at their end regions without disturbing the electrical conductivity or physical integrity of the cell structure. The compressed, folded cell sheet is then folded once again, as in view (5b), about orthogonal axes 58 at CCW and CW folds 52, 59 to yield a final compressed battery cell structure of the same 40 mm×40 mm provided by the foregoing examples, yet possessing both the noted greater effective area and lesser terminal position impedance.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. A method of making a rechargeable battery comprising a folded cell sheet of a separator layer interposed between positive and negative layers, the positive and negative layers further comprising an electrode active material and a current collector, the method characterized by the steps of:

laminating the positive layer to one side of the separator layer and the negative layer to the opposite side of the separator layer to form a sheet having a positive electrical flow path including the positive current collector and a negative electrical flow path including the negative current collector;

folding the sheet along a plurality of axes to define a plurality of cell segments such that at least two sequential folds of said layers are one of the CW direction and the CCW direction and at least one fold of said layers is in the other of the CW direction and the CCW direction, and such that the positive electrical flow path and the negative electrical flow path each pass through the at least two sequential folds and the at least one fold to electrically connect the cell segments;

outwardly exposing at least a portion of one of the current collectors on one side of the folded sheet at a point between the at least two sequential folds, and at least a portion of the other current collector on a side opposite the one side of the folded sheet; and affixing a terminal to the outwardly exposed portion of the current collector on each side of the folded sheet and in electrical connection with the flow path of the current collector.

2. A method according to claim 1 wherein the sheet is folded along a plurality of axes which are parallel to each other.

3. A method according to claim 2 wherein said plurality of cell segments is selected from five to seven.

4. A method according to claim 3 wherein said sheet is folded into five segments in sequential directions of CCW, CW, CW, and CCW.

5. A method according to claim 3 wherein said sheet is folded into seven segments in sequential directions of CCW, CW, CW, CCW, CCW, and CW.

6. A method according to claim 1 wherein the step of outwardly exposing the current collector is accomplished by locating each current collector as a layer outside the electrode active material of each positive and negative layer.

7. A method according to claim 1 wherein each current flow path is created by laminating the current collector of each positive and negative layer as a sheet layer.

8. A method according to claim 7 wherein the each current collector sheet layer is laminated as an open mesh grid.

9. A method according to claim 1 wherein said cell sheet has substantially equilateral dimensions and said folding is effected at a first set of said axes which are parallel and subsequently at a second set of said axes which are orthogonally-disposed to the first set of axes and parallel to each other.

10. A method according to claim 9 wherein each said set consists of three parallel axes.

11. A rechargeable battery comprising a folded cell sheet of a separator layer interposed between positive and negative layers, the positive and negative layers further comprising an electrode layer and a current collector, the battery characterized by:

the positive layer being laminated against one side of the separator layer and the negative layer being laminated against the opposite side of the separator layer to form a sheet having a positive electrical flow path including the positive current collector and a negative electrical flow path including the negative current collector;

the sheet having a plurality of folds along axes defining a plurality of cell segments therebetween, at least two sequential folds are in one of the CW direction and the CCW direction and at least one fold is in the other of the CW direction and the CCW direction, the at least two sequential folds and the at least one fold having the positive electrical flow path and the negative electrical flow path each pass therethrough to electrically connect the plurality of cell segments;

a terminal on one of the positive or negative layers providing electrical connection to the electrical flow path of the one layer and being located on an outwardly exposed side of the folded sheet at a point between the at least two sequential folds providing; and a terminal on the other of the positive or negative layers providing electrical connection to the electrical flow path of the other layer and being outwardly exposed on an outwardly exposed side opposite the above outwardly exposed side of the folded sheet a portion of the other current collector on a side opposite the one side of the folded sheet.

12. A battery according to claim 11 wherein the plurality of folds are along axes which are parallel.

13. A battery according to claim 12 wherein said plurality of cell segments is selected from five and seven.

14. A battery according to claim 13 wherein said sheet is folded into five equal segments in sequential directions of CCW, CW, CW, and CCW.

15. A battery according to claim 13 wherein said sheet is folded into seven equal segments in sequential directions of CCW, CW, CW, CCW, CCW, and CW.

16. A battery according to claim 11 wherein each current collector is accomplished by locating each current collector outwardly exposed as a layer positioned outside the electrode active material of each positive and negative layer.

17. A battery according to claim 11 wherein each current collector of each positive and negative layer is a sheet layer which forms each current flow path.

18. A battery according to claim 17 wherein the each current collector sheet layer is an open mesh grid.

19. A battery according to claim 11 wherein said cell sheet has substantially equilateral dimensions and said folding is effected at a first set of said axes which are parallel and subsequently at a second set of said axes which are orthogonally-disposed to the first set of axes and parallel to each other.

20. A battery according to claim 19 wherein each said set consists of three parallel axes.

* * * * *